(12) United States Patent
Wu et al.

(10) Patent No.: US 9,332,225 B2
(45) Date of Patent: *May 3, 2016

(54) METHOD, APPARATUS, AND SYSTEM FOR CONTROLLING CONFERENCE INCLUDING TELEPRESENCE CONFERENCING SITE

(71) Applicant: Huawei Device Co., Ltd., Shenzhen, Guangdong (CN)

(72) Inventors: Jiaoli Wu, Shenzhen (CN); Honghong Su, Shenzhen (CN); Jing Wang, Shenzhen (CN); Xianyi Chen, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/477,953

(22) Filed: Sep. 5, 2014

(65) Prior Publication Data

US 2014/0375751 A1  Dec. 25, 2014

Related U.S. Application Data

(63) Continuation of application No. 13/484,015, filed on May 30, 2012, now Pat. No. 8,848,023, which is a continuation of application No. PCT/CN2010/079211, filed on Nov. 27, 2010.

(30) Foreign Application Priority Data

Nov. 30, 2009 (CN) .......................... 2009 1 0205982

(51) Int. Cl.
*H04N 7/15* (2006.01)
*H04M 3/56* (2006.01)

(52) U.S. Cl.
CPC ............... *H04N 7/152* (2013.01); *H04M 3/567* (2013.01); *H04N 7/15* (2013.01)

(58) Field of Classification Search
CPC ........... H04N 7/15; H04N 7/152; H04N 7/14; H04N 7/141
USPC .................... 348/14.01–14.16; 370/260–261; 709/204; 715/753
See application file for complete search history.

(56) References Cited

U.S. PATENT DOCUMENTS

2006/0098086 A1  5/2006  Chandra et al.
2007/0091169 A1  4/2007  Zhang et al.

(Continued)

FOREIGN PATENT DOCUMENTS

CN  1832569 A  9/2006
CN  101262587 A  9/2008

(Continued)

OTHER PUBLICATIONS

1$^{st}$ Office Action in corresponding European Patent Application No. 10832670.3 (Aug. 5, 2013).

(Continued)

*Primary Examiner* — Melur Ramakrishnaiah
(74) *Attorney, Agent, or Firm* — Leydig, Voit & Mayer, Ltd

(57) ABSTRACT

Embodiments of the present invention disclose a method, an apparatus, and a system for controlling a conference including a telepresence conference site, and relate to the field of network communications technologies. An embodiment of the present invention provides a method for controlling a conference site in a telepresence conference, including: receiving attribute information of a telepresence conference site sent by the telepresence conference site, where the telepresence conference site includes at least two video areas; and performing conference control according to the received attribute information of the telepresence conference site. Through application of the present invention, the conference control process of the telepresence conference site may be simplified.

14 Claims, 5 Drawing Sheets

(56) References Cited

U.S. PATENT DOCUMENTS

| | | |
|---|---|---|
| 2009/0225152 A1 | 9/2009 | Saleh et al. |
| 2010/0033550 A1* | 2/2010 | Johansen et al. ............ 348/14.08 |
| 2010/0073454 A1* | 3/2010 | Lovhaugen et al. ....... 348/14.03 |
| 2010/0149308 A1 | 6/2010 | Mihara |
| 2012/0069133 A1 | 3/2012 | Wu |

FOREIGN PATENT DOCUMENTS

| | | |
|---|---|---|
| CN | 101335869 A | 12/2008 |
| CN | 101583011 A | 11/2009 |
| CN | 102082944 B | 3/2016 |
| EP | 2437491 A1 | 4/2012 |
| WO | 2009049163 A1 | 4/2009 |

OTHER PUBLICATIONS

Rejection Decision in corresponding Chinese Patent Application No. 200910205982.7 (Jun. 4, 2013).
$2^{nd}$ Office Action in corresponding Chinese Patent Application No. 200910205982.7 (Nov. 29, 2012).
Extended European Search Report in corresponding European Patent Application No. 10832670.3 (Nov. 26, 2012).
$1^{st}$ Office Action in corresponding Chinese Patent Application No. 200910205982.7 (Mar. 23, 2012).
International Search Report in corresponding International Patent Application No. PCT/CN2010/079211 (Mar. 10, 2011).
Written Opinion of the International Searching Authority in corresponding International Patent Application No. PCT/CN2010/079211 (Mar. 10, 2011).
$1^{st}$ Office Action in corresponding U.S. Appl. No. 13/484,015 (Mar. 3, 2014).
"Series H: Audiovisual and Multimedia Systems, Infrastructure of audiovisual services—Communication procedures; Implementors' Guide for Recommendations of the H.323 System (Packet-based multimedia communications systems): H.323, H225.0, H.245, H.246, H.283, H.341, H.450 Series, H.460 Series, and H.500 Series," Telecommunication Standardization Sector of ITU, Implementors' Guide for Recommendations of the H.323 System, pp. i-72, International Telecommunication Union (Nov. 6, 2009).
"Series H: Audiovisual and Multimedia Systems, Infrastructure of audiovisual services—Communication procedures; Control protocol for multimedia communication," Telecommunication Standardization Sector of ITU, Recommendation of the ITU-T H.245, pp. i-324, International Telecommunication Union (Jun. 13, 2008).
"Series H: Audiovisual and Multimedia Systems, Infrastructure of audiovisual services—Communication procedures; Implementors Guide for Recommendations of the H.320 System ("Narrow-band visual telephone systems and terminal equipment"): H.320, H.221, H.224, H.230, H.224, H.243," Telecommunication Standardization Sector of ITU, H.320 System Implementors' Guide, pp. i-5, International Telecommunication Union (Nov. 26, 2004).

\* cited by examiner

METHOD, APPARATUS, AND SYSTEM FOR CONTROLLING CONFERENCE INCLUDING TELEPRESENCE CONFERENCING SITE

CROSS-REFERENCE TO RELATED APPLICATIONS

This application is a continuation of U.S. patent application Ser. No. 13/484,015, filed on May 30, 2012, which is a continuation of International Patent Application No. PCT/CN2010/079211, filed on Nov. 27, 2010. The International Patent Application claims priority to Chinese Patent Application No. 200910205982.7, filed on Nov. 30, 2009. The aforementioned patent applications are hereby incorporated by reference in their entireties.

FIELD OF THE INVENTION

The present invention relates to the field of network communications technologies, and in particular, to a method, an apparatus, and a system for controlling a conference including a telepresence conference site.

BACKGROUND OF THE INVENTION

Presently, telepresence conference site interworking mainly refers to a multimedia conference performed by multiple telepresence conference sites controlled by an MCU (Multipoint Control Unit). The solutions for controlling a telepresence conference that is performed by multiple telepresence conference sites include the following: one example of the solutions is a voice activated switching solution, where all screens of a telepresence conference site with the loudest voice are broadcast to other conference sites, or a selected screen image of the telepresence conference site with the loudest voice is broadcast to other telepresence conference sites, and displayed on corresponding screens of other telepresence conference sites; another one is a life-size image transmission solution.

Each telepresence conference site sends a local life-size image to other telepresence conference sites for implementing a multimedia conference. A specific implementation process of the solution includes: when each telepresence conference site receives life-size images of multiple other telepresence conference sites, first, displaying the first received lift-size image on a whole screen, and reducing and overplaying the subsequently received life-size images of other telepresence conference sites at a lower part of the screen, so that the images of the multiple telepresence conference sites are able to be seen simultaneously.

Another examples of the solutions is a panoramic image transmission solution, where a main camera of each telepresence conference site is adjusted to obtain a panoramic image of a conference site, and then the panoramic image is transmitted to another remote-end telepresence conference site, so that the panoramic images of different telepresence conference sites are able to be seen on different screens of the remote-end telepresence conference site, and the multiple telepresence conference sites are able to be seen simultaneously.

In the process of implementing the life-size image transmission solution and the panoramic image transmission solution, if a conference site that receives a life-size image is a common conference site, the common conference site adopts a multi-picture manner to perform a multimedia conference with a telepresence conference site; if a conference site that receives a panoramic image is a common conference site, the common conference site combines streams of received images of multiple conference sites, and a combined panoramic image of the telepresence conference sites is directly watched.

During the implementation of the present invention, the inventor finds that the prior art has at least the following problems: During the conference control process of a multimedia conference in the prior art, attribute information of each telepresence conference site requiring communication needs to be pre-configured by a conference convener, and in this case, the whole conference control process is complex, and labor costs are high.

SUMMARY OF THE INVENTION

Embodiments of the present invention provide a method, an apparatus, and a system for controlling a conference including a telepresence conference site. The embodiments of the present invention adopt the following technical solutions:

In one aspect, an embodiment of the present invention provides a method for controlling a conference including a telepresence conference site, where the method includes:

receiving attribute information of a telepresence conference site sent by the telepresence conference site, where the telepresence conference site includes at least two video areas; and performing conference control according to the received attribute information of the telepresence conference site.

In another aspect, an embodiment of the present invention further provides a multipoint control unit, where the unit includes:

an information receiving module, configured to receive attribute information of a telepresence conference site sent by the telepresence conference site, where the telepresence conference site includes at least two video areas; and a conference control module, configured to perform conference control according to the received attribute information of the telepresence conference site.

In another aspect, an embodiment of the present invention further provides a conference site terminal, where the conference site terminal includes:

an information sending module, configured to send attribute information of a telepresence conference site, where the telepresence conference site includes at least two video areas; and an information receiving module, configured to receive attribute information of each telepresence conference site delivered by a multipoint control unit.

In another aspect, an embodiment of the present invention further provides a system for controlling a conference including a telepresence conference site, where the system includes:

at least one conference site terminal and at least one multipoint control unit, where the conference site terminal is configured to send attribute information of a telepresence conference site and receive attribute information of each telepresence conference site delivered by the multipoint control unit, where the telepresence conference site includes at least two video areas; and the multipoint control unit is configured to receive the attribute information of the telepresence conference site sent by the telepresence conference site, and perform conference control according to the received attribute information of the telepresence conference site.

According to the method, the apparatus, and the system for controlling a conference including a telepresence conference site provided by the embodiments of the present invention, a conference site may automatically send attribute information of the conference site to a multipoint control unit (MCU) for negotiation of a capability of the conference site, so that a process of negotiation of a capability of each conference site may be completed automatically, and no manual configuration is required, thereby saving a lot of labor costs.

BRIEF DESCRIPTION OF THE DRAWINGS

To illustrate the technical solutions according to the embodiments of the present invention or in the prior art more clearly, the accompanying drawings required for describing the embodiments or the prior art are briefly introduced below. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF THE INVENTION

The technical solutions of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative effects shall fall within the protection scope of the present invention.

Figure 1:
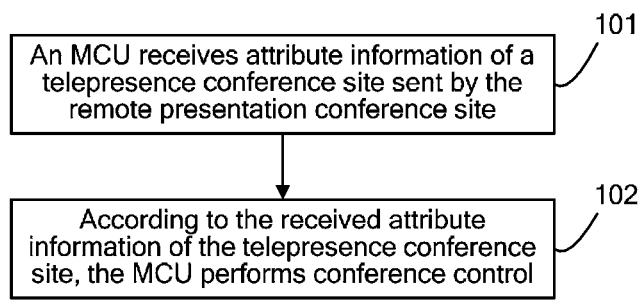
FIG. 1 is a flowchart of a method for controlling a conference including a telepresence conference site according to an embodiment of the present invention.

FIG. 1 shows a method for controlling a conference including a telepresence conference site according to an embodiment of the present invention, where the method includes the following steps:

101: An MCU receives attribute information of a telepresence conference site sent by the telepresence conference site, where the telepresence conference site includes at least two video areas; and the attribute information of the telepresence conference site includes one or any combination of the following items: a type of a conference site, video area information of a conference site, a stream attribute corresponding to a video area of a conference site, a conference site terminal number corresponding to a video area of a conference site, a video area of a conference site, a corresponding relationship between a stream and a conference site terminal, a corresponding relationship between a video area and a stream of a local conference site and telepresence conference site interworking, and a corresponding relationship between a video area and a stream of a local conference site and common conference site interworking.

102: According to the received attribute information of the telepresence conference site, the MCU performs conference control.

It should be noted that, when the conference including the telepresence conference site needs to be performed between multipoint control units, in this step, the number of cascade channels between cascaded multipoint control units may be determined according to the received attribute information of the telepresence conference site, and a corresponding number of cascade channels may be established.

Figure 2:
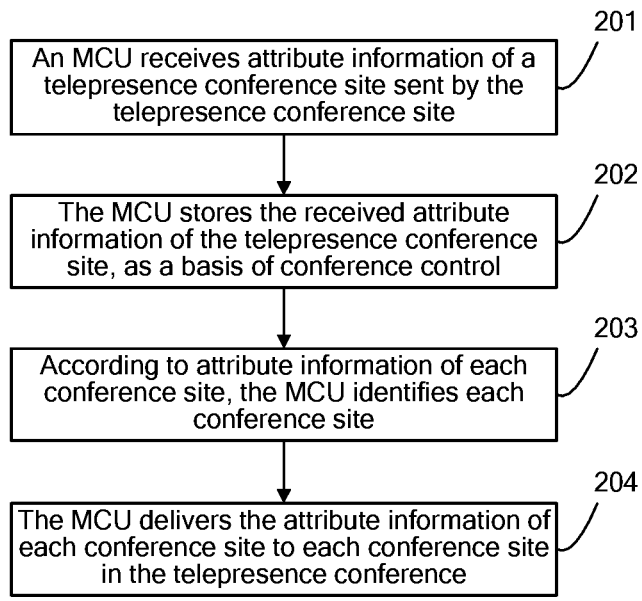
FIG. 2 is a flowchart of implementation of a method for controlling a conference including a telepresence conference site according to an embodiment of the present invention.

FIG. 2 shows an implementation process of a method for controlling a conference including a telepresence conference site according to an embodiment of the present invention, where the process includes the following steps:

201: An MCU receives attribute information of a telepresence conference site sent by the telepresence conference site, where the telepresence conference site includes at least two video areas.

The video areas of the conference site may be understood as that: for conference site areas of the telepresence conference site shot by at least two cameras, a conference site area shot by each camera may be called a video area of the conference site; the video area may perform a multimedia conference with video areas of another conference site respectively. For example, it is assumed that the telepresence conference site includes three conference site terminals, three screens, and three cameras. A video area 1 shot by a camera 1 may perform a multimedia conference with a corresponding remote-end conference terminal through a conference site terminal 1, and the screen 1 may display video information of a corresponding remote-end video area; a video area 2 shot by a camera 2 may perform a multimedia conference with a corresponding remote-end conference site terminal through a conference site terminal 2, and the screen 2 may display video information of a corresponding remote-end video area, and so on. The video areas of the conference site may also be understood as that: a whole telepresence conference site is shot by using a high-resolution camera, and the area of the whole shot conference site is divided into at least two video areas, for example, video division may be performed on the area of the whole conference site according to preset coordinates or an image size; and the video area may perform a multimedia conference with video areas of another conference site. For example, it is assumed that the telepresence conference site includes three conference site terminals, one screen, and one camera. The screen may be divided into three areas according to the number of conference site terminals, an area shot by the camera may also be divided into three areas according to the number of conference site terminals, and an area 1 shot by the camera is sent to a corresponding terminal of a remote-end conference site after stream processing through a conference site terminal 1, and an area 2 shot by the camera is sent to a corresponding terminal of a remote-end conference site after stream processing through a conference site terminal 2, and so on. The screen is used to display a corresponding video area of the remote-end conference site in a corresponding screen area.

It should be noted that, the received attribute information of each conference site may be understood as that: a local MCU not only receives conference site attribute information reported by each conference site controlled by the local MCU, but also receives attribute information of each conference site controlled by a cascaded MCU, where the attribute information is sent by an MCU cascaded to the local MCU.

It should also be noted that, when the conference including the telepresence conference site needs to be performed between multipoint control units, the local MCU determines the number of cascade channels between cascaded multipoint control units according to the received attribute information of the telepresence conference site, and establish a corresponding number of cascade channels.

When the local MCU needs to perform stream interaction with the cascaded MCUs, after receiving attribute information of a conference site controlled by the local MCU, the local MCU sends, through the established cascade channels, the attribute information of the local MCU conference site to MCUs cascaded to the local MCU, so as to perform stream interaction with each of the cascaded MCUs.

202: The MCU stores the received attribute information of the telepresence conference site as a basis of conference control, for example, as the information that is used by an MCU to configure the policy for the video stream configuration on each conference site for example, when a conference site B needs to perform a video session with a conference site A, where the conference site B is a 2-screen telepresence conference site, and the conference site A is a 4-screen telepresence conference site, the MCU may combine four images of the conference site A into two paths of streams and sends the streams to the conference site B according to conference site attribute information sent by the conference site A and the conference site B.

It should be noted that, in a process of calling between MCUs of a telepresence conference, the local MCU may also send attribute information of a conference site supported by the local MCU to a cascaded MCU of the local MCU; and the local MCU and the cascaded MCU of the local MCU exchange and record attribute information of a conference site of an MCU of an opposite end, as a basis of conference control.

203: According to the attribute information of each conference site, the MCU identifies each conference site. For example, the MCU identifies whether the conference site is a common conference site or a telepresence conference site according to the attribute information, and if the conference site is a telepresence conference site, further identifies a type of the telepresence conference site according to the attribute information of the telepresence conference site, as a basis of image interworking.

It should be noted that, when the conference including the telepresence conference site needs to be performed between multipoint control units, the MCU may determine the number of cascade channels between the cascaded MCUs according to the attribute information of each conference site. For example, a multimedia video conference needs to be performed between an MCU 1 and an MCU 2, the largest number of video areas in attribute information of a single telepresence conference site in the multimedia video conference is 3, and in this case, 3 cascade channels are established between the MCU 1 and the MCU 2 for the multimedia video conference; definitely, the number of cascade channels may also be determined according to other information in the attribute information of the conference site, for example, the number of cascade channels is determined according to the number of video areas of a telepresence conference site on the MCU 1.

204: The MCU delivers the attribute information of each conference site to each conference site in the telepresence conference.

It should be noted that, the each conference site in the conference including a telepresence conference site may be a telepresence conference site and a common conference site.

Figure 3:
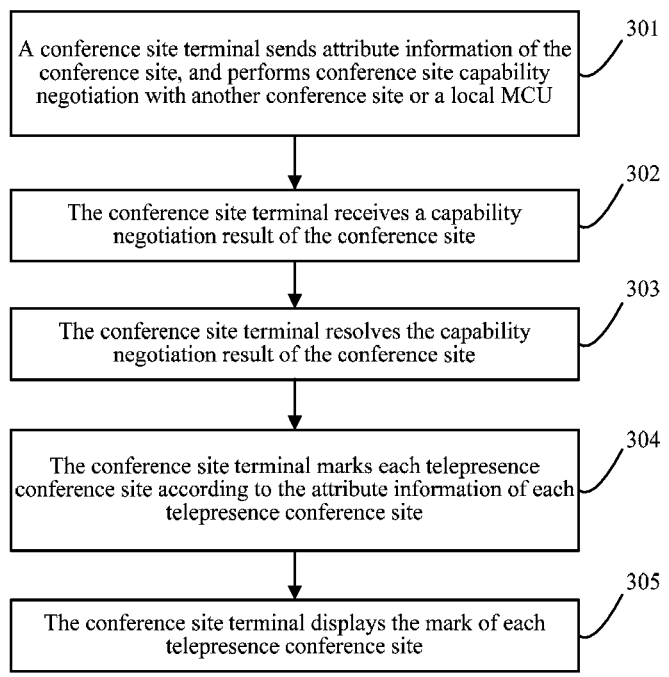
FIG. 3 is a flowchart of a capability negotiation process in a method for controlling a conference including a telepresence conference site according to an embodiment of the present invention.

FIG. 3 shows a capability negotiation process in a method for controlling a conference including a telepresence conference site according to an embodiment of the present invention, where the process includes the following steps:

301: A conference site terminal sends attribute information of the conference site, and performs conference site capability negotiation with another conference site or a local MCU. Specifically, there are two situations. One situation is that: when the conference including a telepresence conference site is a point-to-point conference, a local conference site terminal sends attribute information of the local conference site terminal itself to an opposite-end conference site terminal; further, a conference site terminal of the opposite-end conference site performs conference site capability negotiation according to the received attribute information of the conference site terminal, and returns a capability negotiation result to the local conference site terminal. The other situation is that: when the conference including a telepresence conference site is a multipoint conference, the conference site terminal sends the attribute information of the conference site terminal itself to the local MCU, and the local MCU identifies type and capability information of the conference site according to the received attribute information of the conference site and gives a capability negotiation result; and then, the MCU delivers the capability negotiation result to the conference site terminal.

302: The conference site terminal receives the capability negotiation result of the conference site, where the capability negotiation result includes at least attribute information of the conference site. The attribute information of the telepresence conference site includes one or any combination of the following items: a type of a conference site, video area information of a conference site, a stream attribute corresponding to a video area of a conference site, a conference site terminal number corresponding to a video area of a conference site, a video area of a conference site, a corresponding relationship between a stream and a conference site terminal, a corresponding relationship between a video area and a stream of a local conference site and telepresence conference site interworking, and a corresponding relationship between a video area and a stream of a local conference site and common conference site interworking.

303: The conference site terminal resolves the capability negotiation result of the conference site, and specifically, resolves the attribute information of the conference site from the negotiation result, and then stores the received attribute information of each telepresence conference site.

It should be noted that, if the conference site cannot resolve the received capability negotiation result, the conference site may choose to discard the capability negotiation result, and does not resolve the capability negotiation result.

304: The conference site terminal marks each telepresence conference site according to the attribute information of each telepresence conference site, and a mark is used for a user to identify an attribute and a type of each conference site, thereby facilitating an operation.

305: The conference site terminal displays the mark of each telepresence conference site. Specifically, the conference site terminal may display the attribute information of the conference site, thereby facilitating conference site control by the user.

Figure 4:
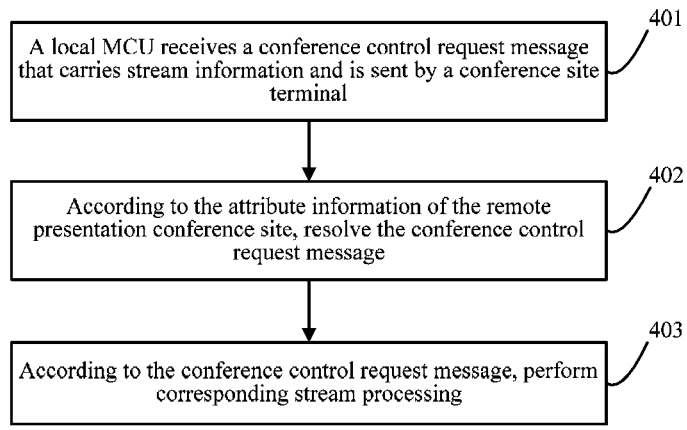
FIG. 4 is a flowchart of a step of performing conference control according to received attribute information of a telepresence conference site in a method for controlling a conference including a telepresence conference site according to an embodiment of the present invention.

FIG. 4 shows a step of performing conference control according to received attribute information of a telepresence conference site in a method for controlling a conference including a telepresence conference site according to an embodiment of the present invention. The step further includes the following steps:

401: A local MCU receives a conference control request message that carries stream information and is sent by a conference site terminal, where the stream information includes one or any combination of the following items: stream information of a life-size image of the telepresence conference site, stream information of a panoramic image of the telepresence conference site, stream information of a slide of the telepresence conference site, primary stream information of a common conference site, and auxiliary stream information of a common conference site.

402: According to the attribute information of the telepresence conference site, resolve the conference control request message, where the conference control request message includes a telepresence screen switching request message and/or a telepresence screen multi-picture request message. When it is determined that the conference control request message is a telepresence screen switching request message through resolution, the MCU may judge a type of the request message according to content of the telepresence screen switching request message and sends conference site screen information and selected conference site information in the request message, where the conference site screen information includes the number of screens, screen data length, and a screen serial number; and the selected conference site information includes a serial number of a selected conference site and a stream serial number of the selected conference site. For example, it is assumed that a message type of the telepresence screen switching request message is selection, the number of screens is 3, the data length of a screen 1 is X, and the screen serial number is 1; and the serial number of the selected conference site is M, and the stream serial number of the selected conference site is 01, the MCU may judge, according to the attribute information of the telepresence conference site, whether the conference site of the telepresence conference site that is selected and whose serial number is M is a conference site controlled by the local MCU, if the conference site is a conference site controlled by the local MCU, a corresponding stream is obtained according to the selected conference site serial number M and the stream serial number 01 of the selected conference site; and if the local MCU determines that the conference site of the telepresence conference site that is selected and whose serial number is M is a conference site controlled by a cascaded MCU of the local MCU, the corresponding stream may be obtained from the cascaded MCU through the cascade channel.

The telepresence screen switching request message includes at least one or any combination of the following items: stream type serial number information of the telepresence conference site, multi-picture indication information of the telepresence conference site and stream type serial number information of a common conference site. The specific content of the telepresence screen switching request message is shown in Table 1.

The telepresence screen multi-picture request message includes at least one of the following items: a type of the request message, the number of screens, data length of each screen, a serial number of each screen, a type of a selected multi-picture of each screen, and a stream serial number corresponding to each sub-picture in each screen. The specific content of the telepresence screen multi-picture request message is shown in Table 1.

It should be noted that, after the MCU receives the telepresence screen switching request message or the telepresence screen multi-picture request message, the MCU may correspondingly return a telepresence screen switching response message or a telepresence screen multi-picture response message according to a resolution result of the MCU.

The specific content of the telepresence screen switching request and response messages and the telepresence screen multi-picture request and response messages is shown in Table 1.

TABLE 1

| Message ID | Message Description | Message Content |
|---|---|---|
| XXXXXXX | Telepresence screen switching request message | +0 B request type (0: Selection; 1: Broadcast; 2: Call-over)<br>+1 B the number of screens<br>+2 B data length of screen 1<br>+3 B serial number of screen 1<br>+4 B selected conference site M<br>+5 B selected conference site T<br>+6 B stream serial number of the selected conference site<br>. . .<br>+~B data length of screen n<br>+~B serial number of screen n<br>+~B selected conference site M<br>+~B selected conference site T<br>+~B stream serial number of the selected conference site |
| XXXXXXX | Telepresence screen switching response message | +0 B the number of screens:<br>+1 B data length of screen 1<br>+2 B result of screen 1: (0: success; 1: failure)<br>+3 DW failure reason ID of screen 1<br>. . .<br>+~B data length of screen n<br>+~B result of screen n: (0: success; 1: failure)<br>+~DW failure reason ID of screen n |

TABLE 1-continued

| Message ID | Message Description | Message Content |
|---|---|---|
| XXXXXXX | Telepresence screen multi-picture request message<br>Remarks: If a request type of the message is merely configuration, do not switch a video that is currently watched; and if the request type of the message is selection or broadcast or call-over, it is indicated that a multi-picture needs to be configured first, and then a video switching operation of a relevant request is performed, for example, when the request type is selection of a multi-picture, the configured multi-picture is watched on a corresponding screen. | +0 B request type (0: Configuration; 1: Selection; 2: Broadcast; 3: Call-over)<br>+1 B the number of screens<br>+2 B data length of screen 1<br>+3 B serial number of screen 1<br>+4 B type of a configured multi-picture<br>+6 B conference site M corresponding to a stream of sub-picture 1 in the multi-picture<br>+7 B conference site T corresponding to a stream of sub-picture 1 in the multi-picture<br>+8 B stream serial number of sub-picture 1 in the multi-picture<br>+9 B conference site M corresponding to a stream of sub-picture 2 in the multi-picture<br>. . .<br>+~B data length of screen n<br>+~B serial number of screen n<br>+~B type of configured multi-picture<br>+~B conference site M corresponding to a stream of sub-picture 1 in the multi-picture<br>+~B conference site T corresponding to a stream of sub-picture 1 in the multi-picture<br>+~B stream serial number of sub-picture 1 in the multi-picture<br>+~B conference site M corresponding to a stream of sub-picture 2 in the multi-picture<br>. . . |
| XXXXXXX | Telepresence screen multi-picture request message<br>Remarks: This is an operation request message of simplifying a multi-picture, where the message does not include a configuration operation. | +0 B request type (0: Selection; 1: Broadcast; 2: Call-over)<br>+1 B the number of screens<br>+2 B data length of screen 1<br>+3 B serial number of screen 1<br>+4 B operated multi-picture mark (for example, particular numbers M and T, or a group number of a multi-picture)<br>. . .<br>+~B data length of screen n<br>+~B serial number of screen n<br>+~B operated multi-picture mark (for example, particular numbers M and T, or a group number of a multi-picture)<br>. . . |
| XXXXXXX | Telepresence screen multi-picture response message | +0 B the number of screens:<br>+1 B data length of screen 1<br>+2 B result of screen 1: (0: success; 1: failure)<br>+3 DW failure reason ID of screen 1<br>. . .<br>+~B data length of screen n<br>+~B result of screen n: (0: success; 1: failure)<br>+~DW failure reason ID of screen n |

It should also be noted that, the telepresence screen switching request and response messages may also be added with a multi-picture indication mark, for example, when the M number of the selected conference site is 0, it may be indicated that the conference site is a multi-picture, but a specific display situation of each sub-picture in the multi-picture cannot be indicated, so the telepresence screen multi-picture request and response messages need to configure the display situation of each picture of the multi-picture.

It should also be noted that, if the telepresence screen switching request and response messages are used for being sent by the local MCU to the cascaded MCU, the screen serial number may be modified to a serial number of a cascade channel; and the serial number of the cascade channel may also be indicated through a subsequent extension field of the stream serial number of the selected conference site.

403: According to the conference control request message, perform corresponding stream processing. For example, when a screen having a screen serial number of 1 corresponds to two selected conference sites, for example, a selected conference site M and a selected conference site T, and when the stream serial numbers of the conference sites are both 1, the local MCU needs to obtain a stream with the serial number 1 of the selected conference site M and a stream with the serial number 1 of the selected conference site T first; then, the local MCU combines the two paths of obtained streams; and finally, the local MCU sends the combined stream to a screen with a screen serial number 1 of the conference site that sends the conference control request message.

It should be noted that, when the conference including the telepresence conference site needs to be performed between multipoint control units, the step of performing conference control according to the received attribute information of the telepresence conference site further includes:

according to the received attribute information of the telepresence conference site, determining the number of cascade channels between cascaded multipoint control units is determined, and establishing a corresponding number of cascade channels.

When the stream information carried in the conference control request message is stream information of a conference site controlled by a cascaded multipoint control unit, after step 402, the following steps may further be included:

According to the conference control request message, an image switching request message carrying stream information is sent to the cascaded multipoint control unit MCU, where the image switching request message includes at least a multi-channel image switching message between cascaded multipoint control units; the multi-channel image switching message between the cascaded multipoint control units includes at least one of the following items: a serial number of the cascade channel, a serial number of a switched conference site, a stream serial number of the switched conference site, and channel operation type information; and the specific content of the multi-channel image switching message between the cascaded multipoint control units is shown in Table 2.

TABLE 2

| Message ID | Message Description | Message Content |
|---|---|---|
| XXXXXXX | Multi-channel image switching message between cascaded MCUs | +0 B serial number of the cascade channel; +1 B switched conference site M +2 B switched conference site T +3 B stream serial number of the switched conference site +4 B channel operation type (0: Selection; 1: Broadcast; 2: Call-over; 3: Screen switching) |

A corresponding stream of the cascaded multipoint control unit is obtained through the cascade channel.

It should also be noted that, when the stream information carried in the conference control request message is stream information of a conference site controlled by a cascaded multipoint control unit, step 403 of performing corresponding stream processing according to the conference control request message may further include:

according to the conference control request message, resolving whether the obtained stream needs to be combined;

if the obtained stream needs to be combined, performing stream combination processing, and delivering a combined stream after processing to the conference site that sends the request; and if the obtained stream does not need to be combined, delivering the obtained stream to the conference site that sends the request.

Figure 5:
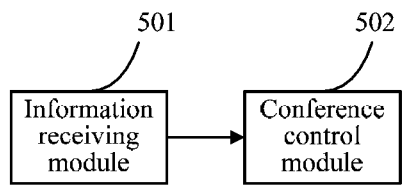
FIG. 5 is a schematic structural diagram of a multipoint control unit according to an embodiment of the present invention.

FIG. 5 shows a multipoint control unit according to an embodiment of the present invention, where the unit includes:

an information receiving module 501, configured to receive attribute information of a telepresence conference site sent by the telepresence conference site, where the telepresence conference site includes at least two video areas; and a conference control module 502, configured to perform conference control according to the received attribute information of the telepresence conference site.

The conference control module 502 may include:

an information storage submodule, configured to store the received attribute information of the telepresence conference site, as a basis of conference control;

an information identification submodule, configured to identify each conference site according to attribute information of each conference site; and an information delivery submodule, configured to deliver the attribute information of each conference site to each conference site in a telepresence conference.

The conference control module 502 may further include:

a request message receiving submodule, configured to receive a conference control request message carrying stream information; where the stream information includes one or any combination of the following items: stream information of a life-size image of the telepresence conference site, stream information of a panoramic image of the telepresence conference site, stream information of a slide of the telepresence conference site, primary stream information of a common conference site, and auxiliary stream information of a common conference site;

a request message resolution submodule, configured to resolve the conference control request message according to the attribute information of the telepresence conference site; and a stream processing submodule, configured to perform corresponding stream processing according to the conference control request message.

It should be noted that, when the conference including the telepresence conference site needs to be performed between multipoint control units, the conference control module further includes:

a cascade channel establishment submodule, configured to, according to the received attribute information of the telepresence conference site, determine the number of cascade channels between the cascaded multipoint control units, and establish a corresponding number of cascade channels.

It should also be noted that, when the stream information carried in the conference control request message is stream information of a conference site controlled by a cascaded multipoint control unit, the stream processing submodule may further include:

a message sending sub-submodule, configured to, according to the conference control request message, send an image switching request message carrying stream information to the cascaded multipoint control unit; and a stream obtaining sub-submodule, configured to obtain a corresponding stream of the cascaded multipoint control unit through the cascade channel.

It should also be noted that, the stream processing submodule may further include:

a resolution sub-submodule, configured to, according to the conference control request message, resolve whether the obtained stream needs to be combined;

a stream combination processing sub-submodule, configured to, if the obtained stream needs to be combined, perform stream combination processing, and deliver a combined stream after processing to the conference site that sends the request; and a stream delivery sub-submodule, configured to, if the obtained stream does not need to be combined, deliver the obtained stream to the conference site that sends the request.

Figure 6:
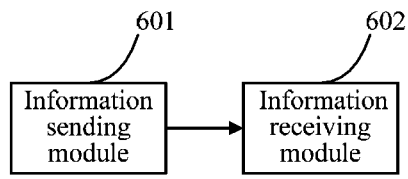
FIG. 6 is a schematic structural diagram of a conference site terminal according to an embodiment of the present invention.

FIG. 6 shows a conference site terminal according to an embodiment of the present invention, where the conference site terminal includes:

an information sending module 601, configured to send attribute information of a telepresence conference site, where the telepresence conference site includes at least two video areas; and an information receiving module 602, configured to receive attribute information of each telepresence conference site delivered by a multipoint control unit.

It should be noted that, the conference site terminal may further include:

an information storage module, configured to store the received attribute information of each telepresence conference site;

a conference site marking module, configured to mark each telepresence conference site according to the attribute information of each telepresence conference site; and a conference site mark display module, configured to display a mark of each telepresence conference site.

It should also be noted that, the conference site terminal may further include:

a request message sending module, configured to send a conference control request message carrying stream information, where the stream information includes one or any combination of the following items: stream information of a life-size image of the telepresence conference site, stream information of a panoramic image of the telepresence conference site, stream information of a slide of the telepresence conference site, primary stream information of a common conference site, and auxiliary stream information of a common conference site; and a stream receiving module, configured to, according to the conference control request message, receive a stream delivered by the multipoint control unit.

Figure 7:
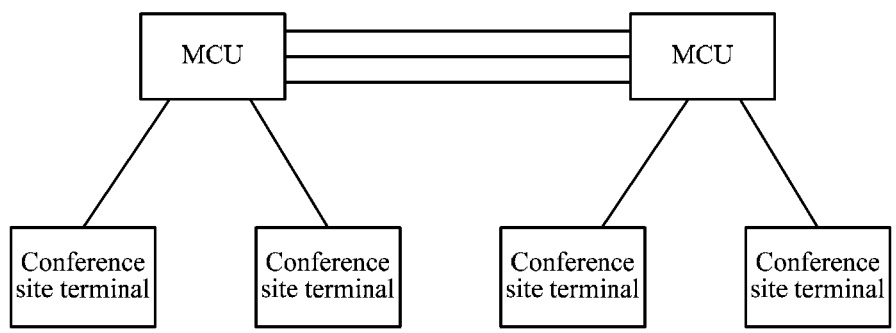
FIG. 7 is a schematic structural diagram of a system for controlling a conference including a telepresence conference site according to an embodiment of the present invention.

FIG. 7 shows a system for controlling a conference including a telepresence conference site according to an embodiment of the present invention, where the system includes at least one conference site terminal and at least one multipoint control unit;

the conference site terminal is configured to send attribute information of a telepresence conference site to the multipoint control unit, receive attribute information of each telepresence conference site delivered by the multipoint control unit, where the telepresence conference site includes at least two video areas; and the multipoint control unit is configured to receive the attribute information of the telepresence conference site sent by the telepresence conference site, and telepresence perform conference control according to the received attribute information of the telepresence conference site.

The conference site terminal includes:

an information sending module, configured to send the attribute information of the telepresence conference site, where the telepresence conference site includes at least two video areas; and an information receiving module, configured to receive the attribute information of each telepresence conference site delivered by the multipoint control unit.

The multipoint control unit includes:

an information receiving module, configured to receive the attribute information of the telepresence conference site sent by the telepresence conference site, where the telepresence conference site includes at least two video areas; and a conference control module, configured to perform conference control according to the received attribute information of the telepresence conference site.

In the following, through three specific scenarios, a system for controlling a conference including a telepresence conference site according to an embodiment of the present invention is illustrated in detail.

Figure 8:
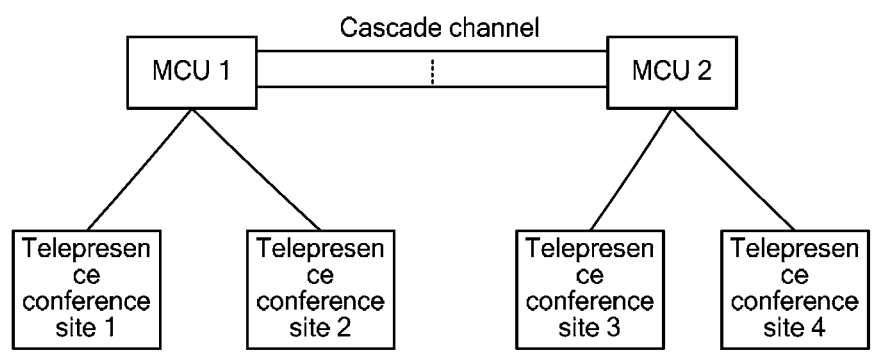
FIG. 8 is a schematic structural diagram of a system for controlling a conference including a telepresence conference site according to an embodiment of the present invention.

FIG. 8 shows a schematic structural diagram of a system for controlling a conference including a telepresence a conference sites according to an embodiment of the present invention. In the following, image switching of a telepresence conference performed between a telepresence conference site 1 and telepresence conference sites 2, 3 and 4 is taken as an example. It is assumed that the telepresence conference site 1 controlled by an MCU 1 sends a telepresence screen switching request message. The specific process is as follows:

801: The MCU 1 receives a telepresence screen switching request message sent by the telepresence conference site 1, where the message is shown in the table below:

| XXXXXXX | Telepresence screen switching request message | +0 B request type (0: Selection; 1: Broadcast; 2: Call-over) |
|---|---|---|
| | | +1 B the number of screens |
| | | +2 B data length of screen 1 |
| | | +3 B serial number of screen 1 |
| | | +4 B selected conference site 2 |
| | | +5 B selected conference site 3 |
| | | +6 B stream serial number of selected conference site |
| | | ... |
| | | +~B data length of screen n |
| | | +~B serial number of screen n |
| | | +~B selected conference site 4 |
| | | +~B stream serial number of selected conference site |

802: The MCU 1 obtains a corresponding stream according to stream information in the received telepresence screen switching request message, where the process of obtaining the corresponding stream is as follows:

1) The MCU 1 determines that the remote conference site 2 is a telepresence conference site controlled by the MCU 1, and the telepresence conference sites 3 and 4 are telepresence conference sites controlled by an MCU 2 cascaded to the MCU 1;

2) The MCU 1 obtains a stream of the remote conference site 2; and

3) The MCU 1 obtains streams of the remote conference sites 3 and 4, where the process of obtaining the streams of the remote conference sites 3 and 4 is as follows: The MCU 1 sends a telepresence screen switching request message carrying stream information of the telepresence conference sites 3 and 4 to the MCU 2; and after receiving the telepresence screen switching request message, the MCU 2 sends corresponding streams of the telepresence conference sites 3 and 4 to the MCU 1 according to the stream information of the telepresence conference sites 3 and 4 carried in the telepresence screen switching request message.

803: The MCU 1 performs conference control processing on the streams of the telepresence conference sites 2, 3 and 4 according to the telepresence screen switching request message sent by the telepresence conference site 1, so as to implement a remote conference between the telepresence conference site 1 and the telepresence conference sites 2, 3 and 4.

Figure 9:
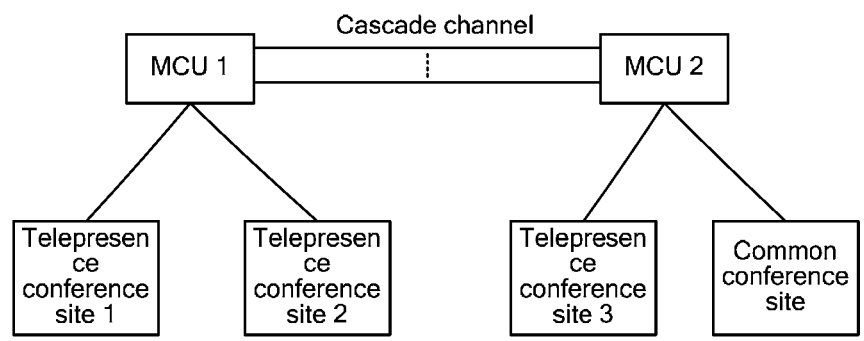
FIG. 9 is a schematic structural diagram of a conference control system for a telepresence conference that is performed between a common conference site and a telepresence conference site according to an embodiment of the present invention.

FIG. 9 shows a schematic structural diagram of a conference control system for a telepresence conference that is performed between a common conference site and a telepresence conference site according to an embodiment of the present invention. In the following, image switching of a telepresence conference performed between a common conference site and telepresence conference sites 1, 2 and 3 is taken as an example. It is assumed that the common conference site controlled by an MCU 2 sends a telepresence screen multi-picture request message. The specific process is as follows:

901: The MCU 2 receives a telepresence screen multi-picture request message sent by the common conference site, where the message is shown in the table below:

conference sites controlled by an MCU 1 cascaded to the MCU 2;

2) The MCU 2 obtains a stream of the remote conference site 3; and

3) The MCU 2 obtains streams of the remote conference sites 1 and 2, where the process of obtaining the streams of the remote conference sites 1 and 2 is as follows: The MCU 2 sends a telepresence screen multi-picture request message carrying stream information of the telepresence conference sites 1 and 2 to the MCU 1; and after receiving the telepresence screen multi-picture request message, the MCU 1 sends corresponding streams of the telepresence conference sites 1 and 2 to the MCU 2 according to the stream information of the telepresence conference sites 1 and 2 carried in the telepresence screen multi-picture request message.

903: The MCU 2 performs processing on the streams of the telepresence conference sites 1, 2 and 3 according to the telepresence screen multi-picture request message sent by the common conference site, so as to implement a remote conference between the common conference site and the telepresence conference sites 1, 2 and 3.

Figure 10:
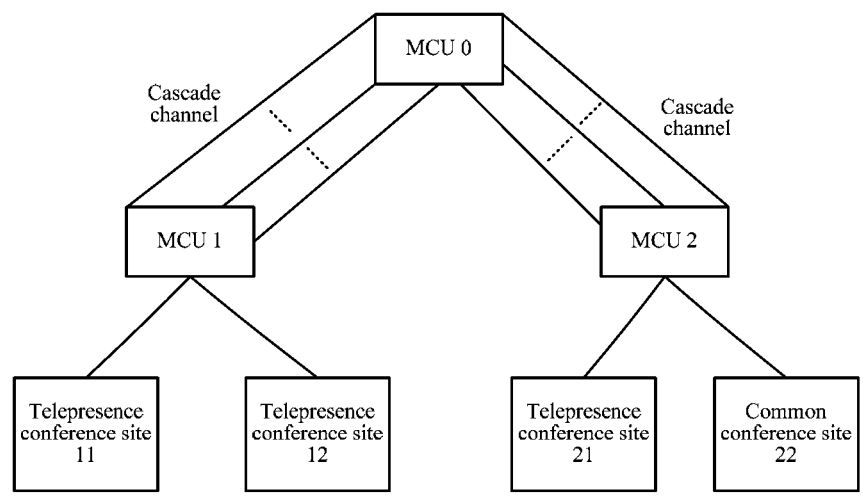
FIG. 10 is a schematic structural diagram of a conference control system for a telepresence conference that is performed between conference sites controlled by cascaded MCUs according to an embodiment of the present invention.

FIG. 10 shows a schematic structural diagram of a conference control system for a telepresence conference that is performed between conference sites controlled by cascaded MCUs. In the following, image switching of a telepresence conference performed between a telepresence conference site 11 and telepresence conference sites 12 and 21 and a common conference site 22 that are in multi-level cascade is taken as an example. It is assumed that the telepresence conference site

| Message ID | Message Description | Message Content |
|---|---|---|
| XXXXXXX | Telepresence screen multi-picture request message | +0 B request type (0: Selection; 1: Broadcast; 2: Call-over) |
| | | +1 B the number of screens |
| | | +2 B data length of screen 1 |
| | | +3 B serial number of screen 1 |
| | | +4 B type of a selected multi-picture |
| | | +6 B M number of sub-picture 1 in the multi-picture |
| | | +7 B T number of sub-picture 1 in the multi-picture |
| | | +8 B stream serial number of sub-picture 1 in the multi-picture |
| | | +9 B M number of sub-picture 2 in the multi-picture |
| | | . . . |
| | | +~B data length of screen n |
| | | +~B serial number of screen n |
| | | +~ B type of a selected multi-picture |
| | | +~ B M number of sub-picture 1 in the multi-picture |
| | | +~ B T number of sub-picture 1 in the multi-picture |
| | | +~ B stream serial number of sub-picture 1 in the multi-picture |
| | | +~ B M number of sub-picture 2 in the multi-picture |
| | | . . . |

902: The MCU 2 obtains a corresponding stream according to stream information in the received telepresence screen multi-picture request message, where the process of obtaining the corresponding stream is as follows:

1) The MCU 2 determines that the remote conference site 3 is a telepresence conference site controlled by the MCU 2, and the telepresence conference sites 1 and 2 are telepresence 11 controlled by an MCU 1 sends a multi-channel image switching message between the cascaded MCUs. The specific process is as follows:

The MCU 1 receives the multi-channel image switching message between the cascaded MCUs sent by the telepresence conference site 11, where the message is shown in the table below.

| Message ID | Message Description | Message Content |
| --- | --- | --- |
| XXXXXXX | Multi-channel image switching message between cascaded MCUs | +0 B channel number;<br>+1 B switched conference site M<br>+2 B switched conference site T<br>+3 B stream serial number of a switched conference site<br>+4 B operation type (0: Selection; 1: Broadcast; 2: Call-over; 3: Screen switching) |

1002: MCU 1 obtains a corresponding stream according to stream information in the received multi-channel image switching message between the cascaded MCUs, where the process of obtaining the corresponding stream is as follows:

1) The MCU 1 determines that the remote conference site 12 is a telepresence conference site controlled by the MCU 1, and the telepresence conference site 21 and the common conference site 22 are conference sites controlled by an MCU 2, which the MCU 2 and the MCU 1 are connected to an MCU 0;

2) The MCU 1 obtains a stream of the remote conference site 12; and

3) The MCU 1 obtains streams of the remote conference site 21 and the common conference site 22, where the process of obtaining the streams of the remote conference site 21 and the common conference site 22 is as follows: The MCU 1 sends a multi-channel image switching message carrying stream information of the telepresence conference site 21 and the common conference site 22 to the MCU 0, the MCU 0 sends the multi-channel image switching message to the MCU 2, and after receiving the multi-channel image switching message, the MCU 2 sends corresponding streams of the telepresence conference site 21 and the common conference site 22 to the MCU 1 through the MCU 0 according to the stream information of the telepresence conference site 21 and the common conference site 22 carried in the multi-channel image switching message.

1003: The MCU 1 performs processing on the streams of the telepresence conference sites 12 and 21 and the common conference site 22 according to the multi-channel image switching message sent by the telepresence conference site 11, so as to implement a remote conference between the telepresence conference site 11 and the telepresence conference sites 12 and 21 and the common conference site 22.

It should be noted that, the scenarios that a stream of conference sites of each cascaded MCU is transmitted through a cascade channel are mainly classified into two types: One type is that each cascade channel is capable of transmitting only a path of stream of a different conference site; and the other type is that each cascade channel is capable of transmitting multiple paths of stream of the same conference site.

According to the method, the apparatus, and the system for controlling a conference including a telepresence conference site according to the embodiments of the present invention, in one aspect, a conference site may automatically send attribute information of the conference site to an MCU for negotiation of a capability of the conference site, so that negotiation of a capability of each conference site may be completed automatically, and no manual configuration is required, thereby saving a lot of labor costs, and moreover, a local MCU may also deliver received attribute information of all conference sites to an conference site controlled by the local MCU, so that the conference site may flexibly perform conference site control. In another aspect, in the embodiments of the present invention, a corresponding stream may be obtained according to stream information in a conference control request message of each conference site in the telepresence conference where the stream may be a local stream, and may also be a cascaded MCU stream, and then conference control processing is performed on the stream according to the conference control request message. In this way, not only a multimedia conference may be performed between telepresence conference sites under one MCU, but also a multimedia conference may be performed between telepresence conference sites under multiple cascaded MCUs. In another aspect, in the embodiments of the present invention, stream interaction of a panoramic image and a slide may be performed through telepresence screen switching request and response messages, and if a common conference site exists, interaction of a primary stream and an auxiliary stream may also be performed through telepresence screen switching request and response messages.

Through the preceding descriptions of the embodiments, it is apparent to those skilled in the art that, the present invention may be accomplished by software together with a necessary universal hardware platform, and definitely may also be completely accomplished by hardware. In most cases, the former is a better implementation manner. Therefore, all or a part of the preceding technical solutions of the present invention that makes contributions to the prior art can be substantially embodied in a form of a software product. The computer software product may be stored in a computer readable storage medium and contains several instructions to instruct a computer equipment (for example, a personal computer, a server, or a network equipment) to perform the method described in each of the embodiments of the present invention.

The preceding descriptions are merely exemplary embodiments of the present invention, but not intended to limit the present invention. Any modification, equivalent replacement, and improvement made without departing from the spirit and principle of the present invention shall fall within the protection scope of the present invention.

What is claimed is:

1. A method for controlling a conference including a telepresence conference site and a plurality of additional conference sites, the method comprising:
   receiving attribute information of the telepresence conference site sent by the telepresence conference site, wherein the telepresence conference site comprises at least two video areas; and
   performing conference control according to the received attribute information of the telepresence conference site;
   wherein the attribute information of the telepresence conference site comprises one or any combination of the following items: a type of a conference site, video area information of the conference site, a stream attribute corresponding to a video area of the conference site, a conference site terminal number corresponding to the video area of the conference site, the video area of the conference site, a corresponding relationship between a stream and a conference site terminal, a corresponding relationship between the video area and a stream of the conference site and telepresence conference site interworking, and a corresponding relationship between the video area and the stream of the local conference site and common conference site interworking;

wherein when the conference including the telepresence conference site needs to be performed between multipoint control units, the performing the conference control further comprises:

according to the received attribute information of the telepresence conference site, determining a number of cascade channels between cascaded multipoint control units; and establishing the determined number of the cascade channels.

2. The method for controlling the conference including the telepresence conference site according to claim 1, wherein the performing the conference control comprises:

storing the received attribute information of the telepresence conference site, as a basis of the conference control.

3. The method for controlling the conference including the telepresence conference site according to claim 1, wherein the performing the conference control comprises:

identifying each of the conference sites according to the attribute information of each of the conference sites.

4. The method for controlling the conference including the telepresence conference site according to claim 1, wherein the performing the conference control comprises:

delivering the attribute information of each of the plurality of additional conference sites to the telepresence conference site.

5. The method for controlling the conference including the telepresence conference site according to claim 1, wherein when the stream information carried in the conference control request message is the stream information of the conference site controlled by one of the cascaded multipoint control units, the performing the corresponding stream processing according to the conference control request message comprises:

according to the conference control request message, sending an image switching request message carrying the stream information to the cascaded multipoint control unit; and obtaining a corresponding stream of the cascaded multipoint control unit through one of the cascade channels.

6. The method for controlling the conference including the telepresence conference site according to claim 5, wherein the step of performing the corresponding stream processing according to the conference control request message further comprises:

according to the conference control request message, resolving whether the obtained stream needs to be combined;

if the obtained stream needs to be combined, performing stream combination processing and delivering a combined stream after processing to the conference site that sent the request; and if the obtained stream does not need to be combined, delivering the obtained stream to the conference site that sent the request.

7. The method for controlling the conference including the telepresence conference site according to claim 6, wherein the image switching request message comprises at least a multi-channel image switching message between the cascaded multipoint control units, and the multi-channel image switching message between the cascaded multipoint control units comprises at least one of the following items: a serial number of the cascade channel, a serial number of a switched conference site, a stream serial number of the switched conference site, and channel operation type information.

8. A multipoint control apparatus, comprising a processor and a non-transitory processor-readable medium having processor-executable instructions stored thereon, the processor-executable instructions including a plurality of modules, the modules including:

an information receiving module, configured to receive attribute information of a telepresence conference site sent by the telepresence conference site, wherein the first telepresence conference site comprises at least two video areas; and a conference control module, configured to perform conference control according to the received attribute information of the telepresence conference site;

wherein the attribute information of the telepresence conference site comprises one or any combination of the following items: a type of a conference site, video area information of the conference site, a stream attribute corresponding to a video area of the conference site, a conference site terminal number corresponding to the video area of the conference site, the video area of the conference site, a corresponding relationship between a stream and a conference site terminal, a corresponding relationship between the video area and a stream of the conference site and telepresence conference site interworking, and a corresponding relationship between the video area and the stream of the local conference site and common conference site interworking;

wherein the conference control module further comprises:
a cascade channel establishment submodule, configured to, according to the received attribute information of the telepresence conference site, determine a number of cascade channels between cascaded multipoint control units, and establish the number of the cascade channels, when a conference including the telepresence conference site needs to be performed between multipoint control units.

9. The multipoint control unit according to claim 8, wherein the conference control module comprises:

an information storage submodule, configured to store the received attribute information of the telepresence conference site, as a basis of the conference control; and an information identification submodule, configured to identify each of the conference sites according to the attribute information of each of the conference sites.

10. The multipoint control unit according to claim 8, wherein the conference control module comprises:

a request message receiving submodule, configured to receive a conference control request message carrying stream information; wherein the stream information comprises one or any combination of the following items: stream information of a life-size image of the telepresence conference site, stream information of a panoramic image of the telepresence conference site, stream information of a slide of the telepresence conference site, primary stream information of a common conference site, and auxiliary stream information of the common conference site;

a request message resolution submodule, configured to resolve the conference control request message according to the attribute information of the first telepresence conference site; and a stream processing submodule, configured to perform corresponding stream processing according to the conference control request message.

11. The multipoint control unit according to claim 8, wherein the stream processing submodule comprises: a message sending sub-submodule, and a stream obtaining sub-submodule, wherein when the stream information carried in the conference control request message is the stream information of a conference site controlled by one of the cascaded multipoint control units, the message sending sub-submodule is configured to, according to the conference control request message, send an image switching request message carrying the stream information to the cascaded multipoint control unit; and the stream obtaining sub-submodule is configured to obtain a corresponding stream of the cascaded multipoint control unit through the cascade channel.

12. The multipoint control unit according to claim 11, wherein the stream processing submodule further comprises:

a resolution sub-submodule, configured to, according to the conference control request message, resolve whether the obtained stream needs to be combined;

a stream combination processing sub-submodule, configured to, if the obtained stream needs to be combined, perform stream combination processing, and deliver a combined stream after processing to the conference site that sends the conference control request message; and a stream delivery sub-submodule, configured to, if the obtained stream does not need to be combined, deliver the obtained stream to the conference site that sends the conference control request message.

13. A system for controlling a conference including a telepresence conference site having at least two video areas, comprising at least one conference site terminal and at least one multipoint control unit, wherein the conference site terminal is configured to send attribute information of the telepresence conference site to the at least one multipoint control unit; and the at least one multipoint control unit is configured to receive the attribute information of the telepresence conference site sent by the telepresence conference site, and perform conference control according to the received attribute information of the telepresence conference site;

wherein when the conference including the telepresence conference site needs to be performed between multipoint control units, the at least one multipoint control unit is further configured to determine a number of cascade channels between cascaded multipoint control units according to the received attribute information of the telepresence conference site, establish the determined number of the cascade channels.

14. A method for controlling a conference including a telepresence conference site and a plurality of additional conference sites, the method comprising:

receiving attribute information of the telepresence conference site sent by the telepresence conference site, wherein the telepresence conference site comprises at least two video areas; and performing conference control according to the received attribute information of the telepresence conference site;

wherein the attribute information of the telepresence conference site comprises one or any combination of the following items: a type of a conference site, video area information of the conference site, a stream attribute corresponding to a video area of the conference site, a conference site terminal number corresponding to the video area of the conference site, the video area of the conference site, a corresponding relationship between a stream and a conference site terminal, a corresponding relationship between the video area and a stream of the conference site and telepresence conference site interworking, and a corresponding relationship between the video area and the stream of the local conference site and common conference site interworking;

wherein the performing the conference control comprises:

receiving a conference control request message carrying stream information, wherein the stream information comprises one or any combination of the following items: stream information of a life-size image of the telepresence conference site, stream information of a panoramic image of the telepresence conference site, stream information of a slide of the telepresence conference site, primary stream information of a common conference site, and auxiliary stream information of the common conference site;

resolving the conference control request message according to the attribute information of the telepresence conference site; and performing corresponding stream processing according to the conference control request message;

wherein the conference control request message comprises: a telepresence screen multi-picture request message;

wherein the telepresence screen multi-picture request message comprises a type of a selected multi-picture of each screen and a stream serial number corresponding to each sub-picture in each screen.

* * * * *